8105X SHEPHERD WHITMANS
Patented 22 Mar 1834.
FUR CLEANER.
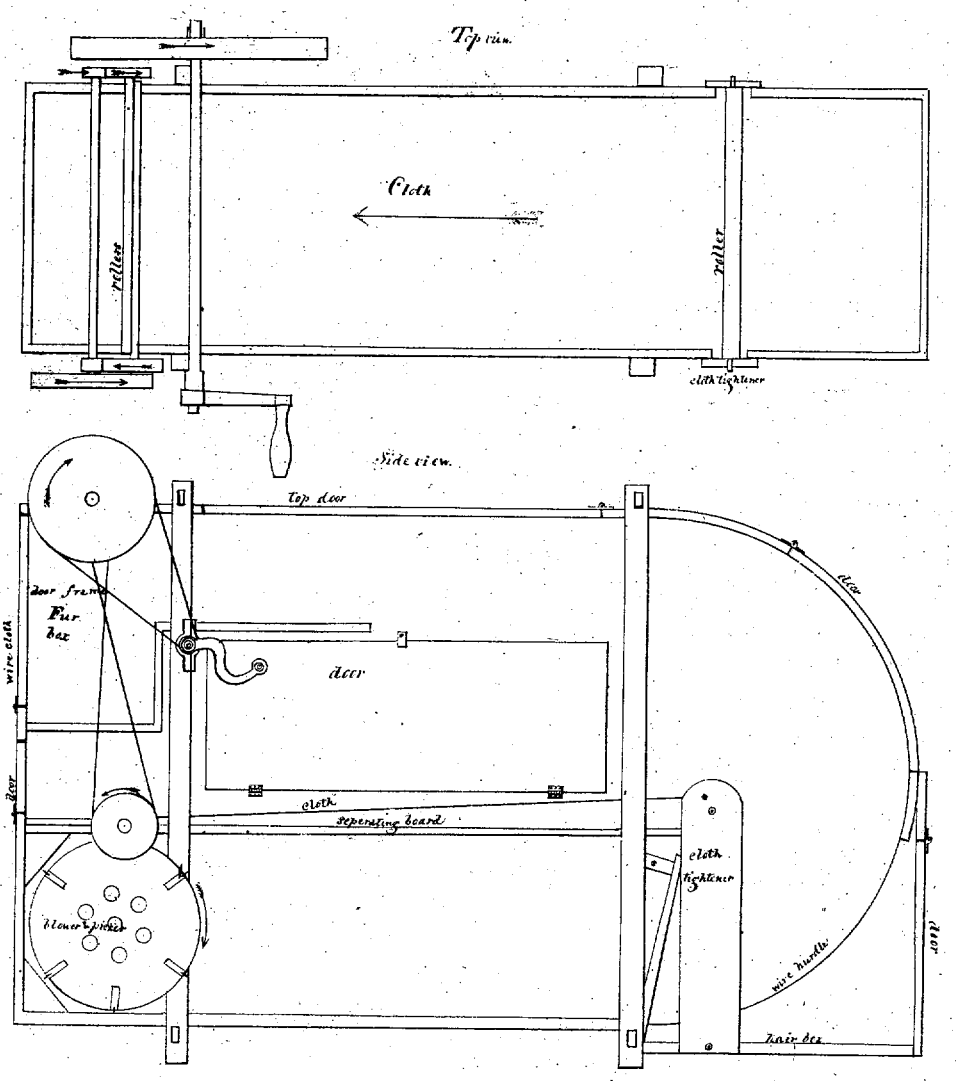

Shepherd Whitman.
Letters Patent

The Schedule referred to in these Letters Patent and making part of the same containing a description in the words of the said Shepherd Whitman himself of his improvement in the Blowing machine for cleaning Fur of hair. ——

To all to whom these presents shall come. Be it known that I Shepherd Whitman of New Albany in the County of Floyd & State of Indiana have invented a new and useful improvement in the process of cleaning fur of hair & that the following is a full and exact description of the construction & operation of the said machine as invented & improved by me. It consists of a frame seven feet long 2 feet wide & 4 feet high all made square excepting at the after-end at the upper part where is a curve of ninety degrees. This frame is filled in with thin plank & furnished with doors as follows. At the bottom and at one end is placed a blowing wheel 16 inches diameter & two feet long. On the shaft are fastened two circles of wood 16 inches in diameter & 3/4 inch thick. 21 inches apart into the rims of these circles are inserted 4, 6 or 8 leaves or buckets 2 inches wide & 1/2 in thick. These buckets are filled with wire pins about the size of a common knitting needle 3/8 of an inch long & 1/4 of an inch apart. The ends of these teeth should be all the same distance from the centre of the shaft this forms the blower & picker.
Near the centre of the circles into which the buckets are inserted are 6 holes 2 inches diameter forming a circle round each end of the shaft (as will be seen in the drawings) to let in air for blowing). This blower is put in motion by means of a strap from the driving wheel which is 2 feet diameter) acting on a pulley 1 2. diameter so that the blower makes 12 revolutions while the driving wheel makes one. The rollers are made to move slowly reducing pulleys so as to make one revo-
lution lution while the driving wheel makes 18 or 20. They are
made to press each other by springs. The conveying cloth
goes round one. the other is covered with fur glued to it. so as to
hold the fur between them the better. the friction of the cloth
on the roller causes the cloth to move with the roller or as
the roller moves; thus carrying the fur which is laid on
the conveying cloth to pass between the rollers. Opposite
the blower at the farther end is a circular wire hurdle thro'
which the hair passes as it is blown in that direction while
the fur from its lightness rises turning round and upward
until it gets over the conveying cloth when it either goes
on in a horizontal direction until it arrives at the fur
box stopped by the wire cloth at the extremity of the fur box
or it falls down to the conveying cloth if it contains any
hair & takes the same rout again until it is rid of all its
hair. when it will rise into the fur box if the wind is
properly regulated. The wind may be regulated by in-
creasing or lessening the holes in the blower or by raising the
fur box or by covering part of the wire cloth before the fur
box. However I have found that the proportions above
given of motions &c to answer extremely well in practice.
There are 6 doors which can be seen on the drawings. the one
on the side is to put the fur in at the one at the forward
& upper end is to take out the cleaned fur at the others are
for convenience of getting at any part of the machine when
out of repair &c. The ground on which a patent is claimed
are 1st the compactness & portableness of the machine, 2nd
the neatness & economy of its works. 3d causing the fur to pass
from below in half circle round & upwards. thus leaving the
hair at the bottom. 4th The placing the conveying cloth
in the inside of the machine so as to cause the fur to pass
thro' & thro' the rollers until it is divested of all its hair
thereby saving the trouble of carrying round by hand. 5th By By its falling on the cloth when floating in the air it is much more even & nice than it can be laid by hand. In testimony that the above is a true specification of my said invention or improvement as above, I have hereunto set my hand.

Witnesses
William B. Green
Kristiam M. Houghs

Shepherd Whitman

Exd.
M.F.C.

884 [illegible]